United States Patent [19]

Groenhof

[11] 4,431,578
[45] Feb. 14, 1984

[54] SILICONE COMPOSITIONS FOR BURIED ELECTRICAL SPLICE CLOSURES

[75] Inventor: Eugene D. Groenhof, Freeland, Mich.

[73] Assignee: Dow Corning Corporation, Midland, Mich.

[21] Appl. No.: 325,261

[22] Filed: Nov. 27, 1981

[51] Int. Cl.³ .................. H01B 3/46; H01F 27/12; H01G 4/04

[52] U.S. Cl. .................. 252/573; 174/110 S; 174/137 B; 174/DIG. 1; 336/94; 361/327; 524/492; 524/588; 524/730; 524/731; 556/450; 556/451; 560/89; 585/25

[58] Field of Search .................. 252/573; 174/110 S, 174/137 B, DIG. 1; 336/94; 361/327; 524/492, 588, 730, 731; 556/450, 451; 560/89; 585/25

[56] References Cited

U.S. PATENT DOCUMENTS

| | | | |
|---|---|---|---|
| 2,945,817 | 7/1960 | Goldblum | 252/317 |
| 3,948,789 | 4/1976 | Brooks | 252/65 |
| 3,984,338 | 10/1976 | Vincent | 336/94 |
| 4,101,499 | 7/1978 | Herzig | 524/731 |
| 4,155,864 | 5/1979 | Martin | 336/94 |
| 4,283,592 | 8/1981 | Brownell, Jr. | 174/21 R |
| 4,317,953 | 3/1982 | Brownell et al. | 174/21 R |

FOREIGN PATENT DOCUMENTS 50-82599 7/1975 Japan.
7582599 7/1975 Japan.

OTHER PUBLICATIONS

Dow Corning Corp., Data Sheets for Dow Corning® 200 Fluid, 230 Fluid and 231 Emulsion.
Groenhof-U.S. Application Ser. No. 261,070, filed May 6, 1981.

*Primary Examiner*—John E. Kittle
*Assistant Examiner*—Robert A. Wax
*Attorney, Agent, or Firm*—Robert L. McKellar

[57] ABSTRACT

A particular dielectric fluid, having a composition with a specific gravity of at least 1.02 and consisting essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel, is employed to encapsulate and insulate an electrical cable splice. The same particular dielectric field composition is also used to fill an electrical cable's conductor interstices.

16 Claims, No Drawings

SILICONE COMPOSITIONS FOR BURIED ELECTRICAL SPLICE CLOSURES

BACKGROUND OF THE INVENTION

1. Field of the Invention

The invention relates to an insulated electrical cable splice employing a particular dielectric fluid to encapsulate and insulate the splice. The dielectric fluid composition, having a specific gravity of at least 1.02, consists essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel. The invention also relates to employing the above dielectric fluid composition to fill an electrical cable's conductor interstices.

2. Description of the Prior Art

Electrical cable splices have been filled with greases, epoxies, and urethanes for the purpose of insulation. Little concern was placed on environmental factors, damage by water entry, and re-entry for maintenance and repair.

U.S. application Ser. No. 261,070, filed May 6, 1981, also assigned to Dow Corning Corporation, discloses the use of a silicone fluid with a specific gravity of at least 1.02 to insulate electrical cable splices. Though this fluid is better environmentally, and reduces the amount of damage by water entry, as compared to the greases, epoxies, and urethanes, it is costly.

It is thus an object of this invention to improve the cable splice by employing a particular dielectric fluid, having a specific gravity of at least 1.02, for the purpose of insulation. This particular dielectric fluid consists essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel. This dielectric fluid composition should cause the water to rise to the top of the container and prevent damage to the electrical cable splices. Another object of this invention is to provide a dielectric fluid composition in which the splice can be easily removed for maintenance or repair. Further objects of this invention include providing a cost-effective dielectric fluid composition that is environmentally safe, has low toxicity, and is able to withstand extreme temperatures.

Insulated electrical cables, such as those insulated with polyethylene, and cross-linked polyethylene, lose significant dielectric strength due to the formation of electrochemical trees in the insulation which may lead to premature failure of these cables. These tree-like patterns can be caused by sulfide or water attack on the insulation of the cables. The trees nucleate and grow only in the presence of conductive liquid. It is an object of this invention to provide a high dielectric strength, low dissipation factor, cost-effective dielectric fluid composition, having a specific gravity of at least 1.02, to fill the conductor interstices of an insulated electrical cable, such as those insulated with polyethylene or cross-linked polyethylene, to prevent electrochemical treeing. The dielectric fluid composition consists essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel.

DETAILED DESCRIPTION

The invention relates to an insulated electrical cable splice employing a particular dielectric fluid to encapsulate and insulate the splice. The dielectric fluid composition, having a specific gravity of at least 1.02, consists essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel. The invention also relates to employing the above dielectric fluid composition to fill an electrical cable's conductor interstices.

More specifically, this invention relates to an insulated electrical cable splice employing a dielectric fluid to encapsulate and insulate the splice, the improvement comprising using as the dielectric fluid a composition having a specific gravity of at least 1.02 and consisting essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel.

This invention also relates to an electrical cable comprising a plurality of conductors covered by an insulating jacket, the improvement comprising filling the interstices between the conductors with a dielectric fluid having a composition with a specific gravity of at least 1.02 and consisting essentially of a silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel.

The dielectric fluid composition employed to insulate and encapsulate the splice of an electrical cable and to fill an electrical cable's conductor interstices, in accordance with this invention, can be any combination of any silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel, as long as the specific gravity of the dielectric fluid composition is at least 1.02. This silicone fluid and additive combination, with a specific gravity of at least 1.02, should cause water, specific gravity of 1.00, which accidentally gets into the container surrounding a splice, to rise to the top of the container and thus prevent an electrical short or damage to the electrical cable splice. Likewise, this special silicone fluid and additive combination prevents formation of harmful electrochemical trees and electrical shorts in the electrical cable. Sea water, however, has a specific gravity of 1.025, so a silicone fluid and additive combination with a specific gravity of at least 1.035 would be used in a sea water environment.

A wide variety of methods for preparing the silicone fluids used in this invention are well known in the art. A person of ordinary skill in the art would be capable of making silicone fluids useful in accordance with this invention by conventional techniques. The additives are then simply mixed with the silicone fluid in proper proportions so as to give a specific gravity of at least 1.02. If volatiles are present in the additive, the additive is mixed with the silicone fluid and the volatiles are then distilled off.

So far as is known at this time the nature of the substituents on the silicone fluid used in this invention are not critical. Thus, for example, hydrogen or any of the hydrocarbon or substituted hydrocarbon substituents normally found on the silicon atoms in silicone fluids can be present. It is preferred, however, that the hydrocarbon substituent contain from 1 to 18 carbon atoms. Specific examples of suitable substituents or radicals are alkyl radicals such as the methyl, ethyl, propyl, butyl, amyl, cyclohexyl, decyl, dodecyl, and octadecyl radicals; alkenyl radicals such as the vinyl and allyl radicals; aryl radicals such as the phenyl and biphenyl radicals; alkaryl and aralkyl radicals such as the tolyl and benzyl radicals; and the correspoding substituted radicals such as the chloropropyl, cyanobutyl, nitrophenyl, mercaptopropyl, carboxyethyl, and aminoisobutyl radicals.

The silicone fluids useful in this invention preferably are siloxanes and have phenyl and methyl substituents or all methyl substituents. It is most preferred for this application that the siloxane polymers contain only methyl substituents due to the low cost thus permitting wide spread use.

The siloxane polymers can be cyclic or linear in structure. The cyclic siloxanes can have a chain length of 3 to 12, with 3 to 8 being preferred. The linear siloxanes can have a chain length of 3 to 100 and can be hydroxyl or hydrocarbon end-blocked. It is preferred, however, that the linear siloxane be hydrocarbon end-blocked. The linear siloxanes can be composed of monoorganosiloxane units, diorganosiloxane units, or triorganosiloxane units, or any combination thereof.

Specific examples of the preferred polymethylsiloxane fluids are those comprised of monomethylsiloxane units, dimethylsiloxane units, and trimethylsiloxane units. The polymethylsiloxane fluid can also be comprised of dimethylsiloxane units and monomethylsiloxane units. The polymethylsiloxane fluid can also be a polydimethylsiloxane. The range of composition which constitutes a useable polymethylsiloxane fluid can be expressed in terms of the $CH_3/Si$ ratio. The methyl to silicon ratio ($CH_3/Si$) should be at least 1.70. Below the ratio of 1.70, the silicone fluid is typically a gel.

Illustrative of the preferred phenyl substituted silicone fluids which are also useful for this invention are those of the type

$(CH_3)_3SiO[(C_6H_5)(CH_3)SiO]_nSi(CH_3)_3$ where n is greater than 3. They can also be of the type

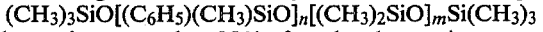
$(CH_3)_3SiO[(C_6H_5)(CH_3)SiO]_n[(CH_3)_2SiO]_mSi(CH_3)_3$ where n is greater than 25% of total and m+n is greater than 10. Other silicone fluids containing phenyl and methyl substituents which can be used are

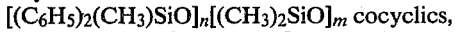
$[(C_6H_5)_2(CH_3)SiO]_n[(CH_3)_2SiO]_m$ cocyclics,
$(C_6H_5)_2CH_3SiO[(CH_3)_2SiO]_nSi(C_6H_5)_2CH_3$, and
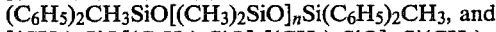
$[(CH_3)_3SiO[(C_6H_5)_2SiO]_n[(CH_3)_2SiO]_mSi(CH_3)_3$, so long as they have the required specific gravity when combined with an additive, soluble in the fluid, selected from the group consisting of trimethylsilyl treated $(CH_3)_3SiO_{\frac{1}{2}}/SiO_2$ resin copolymer, dipropyleneglycoldibenzoate, dixxylylethane, phenylxylylethane, and a mixture of $[(CH_3)_3Si]_2O$ treated silica and a silica aerogel.

Examples of other siloxane fluid copolymers useful in this invention are those comprised of the siloxane units $(CH_3)_3SiO_{\frac{1}{2}}$, $(CH_3)_2SiO$, and either 3-chloro-2 methyl propyl (methyl) siloxane or 3-chloropropyl (methyl) siloxane units containing at least 20 mole percent of the halogenated constituent.

So far as is known at this time, the additives useful in this invention are selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel. The useful additive must be soluble in the silicone fluid selected. The purpose of the additive is to change the specific gravity of the silicone fluid. The effective amount of an additive to alter the specific gravity of the silicone fluid to at least 1.02 is dependent upon the specific gravity of the silicone fluid. Additives such as the dixylylethanes and phenylxylylethanes are useful in lowering the specific gravity of the silicone fluid. Most silicone fluids have a specific gravity of about 1.00, but some of the phenylmethylpolysiloxanes have a specific gravity of greater than 1.04. In order to reduce the cost of the composition, enough additive is added to the silicone fluid to lower the specific gravity closer to, but still greater than, 1.02. Additives, such as dipropyleneglycoldibenzoate, trimethylsilyl treated $(CH_3)_3SiO_{\frac{1}{2}}/SiO_2$ resin copolymer, and a mixture of $[(CH_3)_3Si]_2O$ treated silica and a silica aerogel, are useful to raise the specific gravity of silicone fluids to at least 1.02. The trimethylsilyl treated $(CH_3)_3SiO_{\frac{1}{2}}/SiO_2$ resin copolymer can be used to raise the specific gravity of any silicone fluid it is soluble in. Since there are volatiles present in this particular additive, the silicone fluid and the additive are mixed together and the volatiles are then distilled off.

The dipropyleneglycoldibenzoate additive is soluble only in phenyl containing silicone fluids and therefore can only be used to raise the specific gravity of phenyl containing silicone fluids. The silica aerogel and $[(CH_3)_3Si]_2O$ treated silica mixture is useful to raise the specific gravity of all silicone fluids, as far as it is known at this time. However, it is preferred that this additive mixture not be used to raise the specific gravity of polydimethylsiloxane for the re-enterable splice application, due to settling problems.

Though there is no real limit on the viscosity of the silicone fluid and additive combination useful in this invention, a maximum viscosity of 1000 centistokes at 25° C. is preferred because the splice can then be easily removed for maintenance or repair. A viscosity of 20 to 500 centistokes is the most preferred because it is unique to underground cables for the purpose of easy removal of the splice for maintenance or repair.

A silicone fluid and an additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel, having a specific gravity of at least 1.02, is used as a dielectric fluid to encapsulate and insulate the splice of an electrical cable. The splice closure must protect splice bundles from damage caused by moisture, temperature extremes, and other natural forces. The closure consists of 3 main elements: a sturdy case, a strain relief support structure, and said silicone fluid and additive, having a specific gravity of at least 1.02, used as a natural encapsulant. The dielectric fluid, consisting of said silicone fluid and additive, is funneled, injected, or pressurized into the closure for immediate encapsulation.

A silicone fluid and additive, soluble in said silicone fluid, selected from the group consisting of trimethylsilyl treated $(CH_3)_3SiO_{\frac{1}{2}}/SiO_2$ resin copolymer, dipropyleneglycoldibenzoate, dixylylethane, phenylxylylethane, and a mixture of $[(CH_3)_3Si]_2O$ treated silica and a silica aerogel, having a specific gravity of at least 1.02, is also used to fill the conductor interstices of an electrical cable. Said silicone fluid and additive would be introduced to the cable system by migrating through conductor interstices, and would use the splice box as a replenishable reservoir. The silicone fluid and additive combination could also be introduced to the cable system by funneling, pressurizing, or injecting it into the system. This method could be used to prevent electrochemical treeing in electrical cables, such as those insulated with polyethylene and cross-linked polyethylene. Electrochemical treeing is caused by water and sulfide attack.

In order that those skilled in the art may better understand how the present invention can be practiced, the following examples are given by way of illustration and not by way of limitation. All of the viscosity and specific gravity measurements were taken at 25° C. unless otherwise stated.

EXAMPLE 1

Into a 2 liter, 3 necked flask fitted with a pear shaped stripping head was placed 600 grams of 60 weight percent trimethylsilyl treated $(CH_3)_3SiO_{\frac{1}{2}}/SiO_2$ resin copolymer, 40 weight percent xylene, and 840 grams of phenylmethyl/dimethylsiloxane copolymer with a viscosity of 100 centistokes and a specific gravity of 0.992. This mixture was stirred and then stripped under vacuum to 5 mm at 200° C. The resulting fluid was pressure filtered using a small amount of Super Cel (one of a series of Celite Filter Aids made of exceptionally pure diatomaceous silica, Johns-Manville Sales Corp.). The filtered product was clear and its viscosity was 567 centistokes and its specific gravity was 1.046. The filtered product was too viscous so 500 grams of it was mixed with 100 grams of 100 centistokes phenylmethyl/dimethylsiloxane copolymer with a specific gravity of 0.992. This mixture had a viscosity of 350 centistokes and 1.037 specific gravity. The resulting composition is useful as a dielectric fluid for insulating cable splices and filling conductor interstices in electric cables.

EXAMPLE 2

The following blends were obtained by mixing a silicone fluid with an additive.

| Fluid | Additive | Specific Gravity | Viscosity, cs |
|---|---|---|---|
| 75 weight percent phenylmethyl/dimethylsiloxane, copolymer with a specific gravity of .992 and a viscosity of 100 centistokes. | 25 weight percent trimethylsilyl treated $(CH_3)_3SiO_{\frac{1}{2}}/SiO_2$ resin copolymer. | 1.037 | 250 |
| 70 weight percent of a polymethylsiloxane consisting of 4 weight percent of monomethylsiloxane units, 87 weight percent of dimethylsiloxane units and 9 weight percent of trimethylsiloxane units. | 30 weight percent of trimethylsilyl treated $(CH_3)_3SiO_{\frac{1}{2}}/SiO_2$ resin copolymer | 1.025 | 266 |
| 62 weight percent of a 20 centistoke polydimethylsiloxane. | 38 weight percent of trimethylsilyl treated $(CH_3)_3SiO_{\frac{1}{2}}/SiO_2$ resin copolymer. | 1.028 | 290 |
| 60 weight percent of a phenylmethyl/dimethylsiloxane copolymer having a specific gravity of 1.065 and a viscosity of 25 centistokes. | 40 weight percent of dixylylethane | 1.026 | 47 |
| 50 weight percent of a phenylmethyl/dimethylsiloxane copolymer having a specific gravity of 1.065 and a viscosity of 125 centistokes. | 50 weight percent of phenylxylylethane | 1.023 | 22 |
| 50 weight percent of a phenylmethyl/dimethylsiloxane copolymer specific gravity of 1.065 and a viscosity of 125 centistokes. | 50 weight percent dipropyleneglycoldibenzoate | 1.093 | 93 |

The above compositions are useful as dielectric fluids for insulating cable splices and filling conductor interstices in electric cables.

EXAMPLE 3

Dielectric fluids, consisting essentially of varying amounts of a polydimethylsiloxane with a viscosity of 100 centistokes, hexamethyldisiloxane treated silica, and a silica aerogel, were placed in a cable splice system consisting essentially of a sturdy case and a strain relief support structure. The fluids were then tested for water penetration.

The dielectric fluid is mixed with water in a ratio of 1 to 1. The fluid is removed using a separatory funnel, and its electrical characteristics such as dielectric constant ($D_k$), dissipation factor ($D_f$), and volume resistivity ($V_r$), tested according to ASTM D924, are checked for degradation over a 115 day period.

The test results on the various blends are:

| Composition, weight percent | | | | | Electrical Initials | | | Electricals After 115 days in water | | |
|---|---|---|---|---|---|---|---|---|---|---|
| Silica Aerogel | hexamethyl-disiloxane treated silica | poly-dimethyl-siloxane | Viscosity Cps at 25° C. | Specific Gravity | $D_k$ | $D_f$ | $V_r$ | $D_k$ | $D_f$ | $V_r$ |
| 10 | 3 | 87 | 225 | 1.024 | 3.0 | .0115 | $2.3 \times 10^{13}$ | 3.25 | .0279 | $2.3 \times 10^{13}$ |
| 15 | 9 | 76 | 720 | 1.057 | 2.9 | .0028 | $4.7 \times 10^{12}$ | 3.36 | 0.255 | $5.8 \times 10^{12}$ |
| 12 | 9 | 79 | 385 | 1.037 | 2.9 | .0041 | $1.17 \times 10^{13}$ | 3.35 | 0.38 | $5.23 \times 10^{12}$ |
| 15 | 3 | 82 | 695 | 1.042 | 2.89 | .00215 | $1.2 \times 10^{13}$ | 3.27 | 0.177 | $6.16 \times 10^{13}$ |
| 12 | 3 | 85 | 310 | 1.030 | 3.0 | .0119 | $2.13 \times 10^{13}$ | 3.28 | 0.294 | Free H$_2$O in sample |
| 10 | 9 | 81 | 255 | 1.029 | 2.87 | .002 | $9.41 \times 10^{12}$ | 3.19 | 0.213 | $5.5 \times 10^{12}$ |
| 15 | 6 | 79 | 765 | 1.050 | 2.87 | .0066 | $1.25 \times 10^{13}$ | 3.36 | .029 | $1.17 \times 10^{13}$ |
| 12 | 6 | 82 | 335 | 1.032 | 2.96 | .0068 | $1.25 \times 10^{13}$ | 3.18 | .0168 | $1.17 \times 10^{13}$ |
| 10 | 6 | 84 | 230 | 1.025 | 2.98 | .0115 | $9.4 \times 10^{13}$ | 3.3 | .015 | $5.2 \times 10^{12}$ |

In conclusion, it seems that the silica picks up moisture as exemplified by the increase in the dielectric constant ($D_k$), however it is noteworthy that there is little deterioration of volume resistivity ($V_r$). Since there was considerable settling in all the samples, the tests were run for 115 days instead of the normal 64 days. Due to the settling, however, these samples probably would be excluded for the re-enterable splice application.

That which is claimed is:

1. In an insulated electrical cable splice employing a dielectric fluid to encapsulate and insulate the splice, the improvement comprising using as the dielectric fluid a composition having a specific gravity of at least 1.02 and consisting essentially of a silicone fluid and an additive, soluble in said silicone fluid, selected from the group consisting of trimethylsilyl treated (CH$_3$)$_3$SiO$_{\frac{1}{2}}$/SiO$_2$ resin copolymer, dipropyleneglycoldibenzoate, dixylylethane, phenylxylylethane, and a mixture of [(CH$_3$)$_3$Si]$_2$O treated silica and a silica aerogel.

2. an insulated electrical cable splice as defined in claim 1 wherein the composition has a maximum viscosity of 1000 centistokes at 25° C.

3. An insulated electrical cable splice as defined in claim 2 wherein the composition has a viscosity range of 20 to 500 centistokes at 25° C.

4. An insulated electrical cable splice as defined in claim 3 wherein the silicone fluid is a phenylmethyl/dimethylsiloxane copolymer.

5. An insulated electrical cable splice as defined in claim 3 wherein the silicone fluid is a polymethylsiloxane.

6. An insulated electrical cable splice as defined in claim 5 wherein the polymethylsiloxane has a methyl to silicon ratio of at least 1.70.

7. An insulated electrical cable splice as defined in claim 6 wherein the polymethylsiloxane fluid is selected from the group consisting of polydimethylsiloxane, a fluid comprised of monomethylsiloxane units, dimethylsiloxane units, and trimethylsiloxane units, and a fluid comprised of monomethylsiloxane units and dimethylsiloxane units.

8. An insulated electrical cable splice as defined in claim 1, 2, 3, 4, 5, 6, or 7 wherein the dielectric fluid composition has a specific gravity greater than 1.035.

9. In an electrical cable comprising a plurality of conductors covered by an insulating jacket, the improvement comprising filling the interstices between the conductors with a dielectric fluid having a composition with a specific gravity of at least 1.02 and consisting essentially of a silicone fluid and an additive, soluble in said silicone fluid, selected from the group consisting of trimethylsilyl treated (CH$_3$)$_3$SiO$_{\frac{1}{2}}$/SiO$_2$ resin copolymer, dipropyleneglycoldibenzoate, dixylylethane, phenylxylylethane, and a mixture of [(CH$_3$)$_3$Si]$_2$O treated silica and a silica aerogel.

10. An electrical cable as defined in claim 9 wherein the composition has a maximum viscosity of 1000 centistokes at 25° C.

11. An electrical cable as defined in claim 10 wherein the composition has a viscosity range of 20 to 500 centistokes at 25° C.

12. An electrical cable as defined in claim 11 wherein the silicone fluid is a phenylmethyl/dimethylsiloxane copolymer.

13. An electrical cable as defined in claim 11 wherein the silicone fluid is a polymethylsiloxane.

14. An electrical cable as defined in claim 13 wherein the polymethylsiloxane has a methyl to silicon ratio of at least 1.70.

15. An electrical cable as defined in claim 14 wherein the polymethylsiloxane fluid is selected from the group consisting of polydimethylsiloxane, a fluid comprised of monomethylsiloxane units, dimethylsiloxane units, and trimethylsiloxane units, and a fluid comprised of monomethylsiloxane units and dimethylsiloxane units.

16. An electrical cable as defined in claim 9, 10, 11, 12, 13, 14, or 15 wherein the dielectric fluid composition has a specific gravity greater than 1.035.

* * * * *